United States Patent
Vajge et al.

(10) Patent No.: US 12,482,019 B2
(45) Date of Patent: Nov. 25, 2025

(54) SYSTEM AND METHOD FOR POST TRANSACTION SEASONAL ITEM RECOMMENDATIONS

(71) Applicant: Walmart Apollo, LLC, Bentonville, AR (US)

(72) Inventors: Parth Ramesh Vajge, Sunnyvale, CA (US); Luyi Ma, Sunnyvale, CA (US); Hyun Duk Cho, San Francisco, CA (US); Sushant Kumar, San Jose, CA (US); Kannan Achan, Saratoga, CA (US); Lawrence David Lin, Pleasanton, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 7 days.

(21) Appl. No.: 18/092,062

(22) Filed: Dec. 30, 2022

(65) Prior Publication Data

US 2024/0232941 A1 Jul. 11, 2024

(51) Int. Cl.
G06Q 30/00 (2023.01)
G06Q 30/0241 (2023.01)
G06Q 30/0251 (2023.01)

(52) U.S. Cl.
CPC ..... *G06Q 30/0252* (2013.01); *G06Q 30/0256* (2013.01); *G06Q 30/0277* (2013.01)

(58) Field of Classification Search
CPC .......... G06Q 30/0252; G06Q 30/0256; G06Q 30/0277
See application file for complete search history.

(56) References Cited

U.S. PATENT DOCUMENTS

| 7,069,197 | B1 | 6/2006 | Saidane |
| 8,301,623 | B2 | 10/2012 | Chakrabarti et al. |
| 9,852,193 | B2 | 12/2017 | Chen et al. |
| 10,192,253 | B2 | 1/2019 | Huet et al. |
| 11,100,558 | B1 | 8/2021 | Chanda et al. |

(Continued)

FOREIGN PATENT DOCUMENTS

CN 108805677 A 11/2018

OTHER PUBLICATIONS

O. Contreras Carrasco, "Gaussian Mixture Models Explained," Towards Data Science, Jun. 30, 2019, 27 pages.

(Continued)

*Primary Examiner* — Meredith A Long
(74) *Attorney, Agent, or Firm* — Morgan, Lewis & Bockius LLP; Manita Rawat

(57) ABSTRACT

Systems and methods for post transaction seasonal item recommendations are disclosed. In some embodiments, a current seasonal time window associated with a seasonal event and some seasonal product types is determined. Based on historical transaction data of the seasonal product types, a first seasonal index score is computed for each item, and a second seasonal index score is computed for each product type including one or more items. A seasonal rank score is generated for each item based on the first seasonal index score and the second seasonal index score, such that the items in the historical transaction data are ranked based on their respective seasonal rank scores. Based on the ranked items and a transaction order from a user, a list of recommended items is generated and displayed to the user.

20 Claims, 8 Drawing Sheets

(56) References Cited

U.S. PATENT DOCUMENTS

| | | |
|---|---|---|
| 11,468,494 B2 | 10/2022 | Sinha et al. |
| 2004/0176966 A1* | 9/2004 | Chen .................. G06Q 30/0201 |
| | | 705/28 |
| 2009/0063439 A1* | 3/2009 | Rauser .................. G06Q 30/02 |
| 2017/0287044 A1* | 10/2017 | Rose .................. G06Q 30/0631 |
| 2018/0218430 A1 | 8/2018 | Prendki |
| 2019/0370879 A1 | 12/2019 | Bhattacharjee |
| 2020/0257976 A1 | 8/2020 | Polanía Cabrera et al. |
| 2021/0035188 A1 | 2/2021 | Kysta et al. |
| 2021/0118037 A1* | 4/2021 | Bradley ............. G06Q 30/0631 |
| 2022/0245702 A1* | 8/2022 | Sundaresan .............. G06N 7/01 |
| 2022/0245709 A1 | 8/2022 | Ma et al. |

OTHER PUBLICATIONS

H. Zhao et al., "Recommending Complementary Products in E-Commerce Push Notifications with a Mixture Model Approach," SIGIR' 17, Proceedings of the 40th International ACM SIGIR Conference on Research and Development in Informational Retrieval, Aug. 7-11, 2017, pp. 909-912.

L. Ma et al., "NEAT: A Label Noise-resistant Complementary Item Recommender System with Trustworthy Evaluation," arXiv:2202.05456v1, Feb. 11, 2022, 11 pages.

\* cited by examiner

| pt | week_1 | week_2 | week_3 | ... | week_52 |
|---|---|---|---|---|---|
| Garlands | 92 | 7 | 0 | ... | 2 |
| Party Snacks | 312 | 10 | 18 | ... | 98 |
| Decorating & Pastry Bags | 51 | 13 | 0 | ... | 1 |
| Fruit Flavored Candy | 82 | 33 | 4 | ... | 54 |
| Chocolate & Candy Assortment | 102 | 23 | 58 | ... | 725 |
| Bottled Drinking Waters | 244 | 91 | 42 | ... | 527 |
| Books | 73 | 59 | 2 | ... | 24 |
| Mint Candy | 46 | 10 | 2 | ... | 22 |
| ... | | | | ... | |
| ... | | | | ... | |
| Deodorants & Antiperspirants | 4 | 11 | 9 | ... | 15 |
| Undershirts | 4 | 10 | 1 | ... | 19 |
| Decoration | 19 | 30 | 0 | ... | 101 |

__SYSTEM AND METHOD FOR POST TRANSACTION SEASONAL ITEM RECOMMENDATIONS__

TECHNICAL FIELD

This application relates generally to item recommendations and, more particularly, to systems and methods for providing seasonal item recommendations to a user after a transaction order is placed by the user.

BACKGROUND

Item recommendation tasks in e-commerce industry are essential to improve user experiences by recommending items to users. Conventional recommendation systems provide information about matches between users (e.g., shopping customers) and items (e.g., books, electronics, grocery) based on user interests, user preferences, or historical interactions.

Existing recommendation systems focus on item recommendations before, rather than after, a transaction order is placed by a user. In addition, while seasonality (e.g. a festival) can affect users' shopping behavior in a tangible way, current carousals in each season are provided based on manual curations or inputs by merchants. These curations may focus on trending data, rather than seasonal relevance. As such, the merchant curations require lots of human effort and cannot be used to provide an effective seasonal recommendation in an efficient manner.

Hence, it is challenging yet desirable to provide post transaction seasonal item recommendations effectively and efficiently.

SUMMARY

The embodiments described herein are directed to systems and methods for providing seasonal item recommendations to a user after a transaction order is placed by the user.

In various embodiments, a system including a non-transitory memory configured to store instructions thereon and at least one processor is disclosed. The at least one processor is configured to read the instructions to: obtain seasonal time windows each of which represents a time period associated with a respective seasonal event that is capable of affecting shopping behaviors of users of a retailer, determine a current seasonal time window based on the seasonal time windows and a current time, determine a plurality of seasonal product types associated with the current seasonal time window, obtain historical transaction data of the seasonal product types, compute a first seasonal index score for each item in the historical transaction data, compute a second seasonal index score for each product type in the historical transaction data, wherein each product type includes one or more items in the historical transaction data, generate a seasonal rank score for each item in the historical transaction data based on the first seasonal index score and the second seasonal index score, rank the items in the historical transaction data based on their respective seasonal rank scores, obtain a transaction order from a user device of a user, generate a final list of recommended items based on the transaction order and the ranked items, and transmit the final list of recommended items to the user device for display to the user.

In various embodiments, a computer-implemented method is disclosed. The computer-implemented method includes: obtaining seasonal time windows each of which represents a time period associated with a respective seasonal event that is capable of affecting shopping behaviors of users; determining a current seasonal time window based on the seasonal time windows and a current time; determining a plurality of seasonal product types associated with the current seasonal time window; obtaining historical transaction data of the seasonal product types; computing a first seasonal index score for each item in the historical transaction data; computing a second seasonal index score for each product type in the historical transaction data, wherein each product type includes one or more items in the historical transaction data; generating a seasonal rank score for each item in the historical transaction data based on the first seasonal index score and the second seasonal index score; ranking the items in the historical transaction data based on their respective seasonal rank scores; obtaining a transaction order from a user device of a user; generating a final list of recommended items based on the transaction order and the ranked items; and transmitting the final list of recommended items to the user device for display to the user.

In various embodiments, a non-transitory computer readable medium having instructions stored thereon is disclosed. The instructions, when executed by at least one processor, cause at least one device to perform operations including: obtaining seasonal time windows each of which represents a time period associated with a respective seasonal event that is capable of affecting shopping behaviors of users; determining a current seasonal time window based on the seasonal time windows and a current time; determining a plurality of seasonal product types associated with the current seasonal time window; obtaining historical transaction data of the seasonal product types; computing a first seasonal index score for each item in the historical transaction data; computing a second seasonal index score for each product type in the historical transaction data, wherein each product type includes one or more items in the historical transaction data; generating a seasonal rank score for each item in the historical transaction data based on the first seasonal index score and the second seasonal index score; ranking the items in the historical transaction data based on their respective seasonal rank scores; obtaining a transaction order from a user device of a user; generating a final list of recommended items based on the transaction order and the ranked items; and transmitting the final list of recommended items to the user device for display to the user.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 6 illustrates exemplary transaction data aggregated weekly over different product types, in accordance with some embodiments of the present teaching.

DETAILED DESCRIPTION

Figure 1:
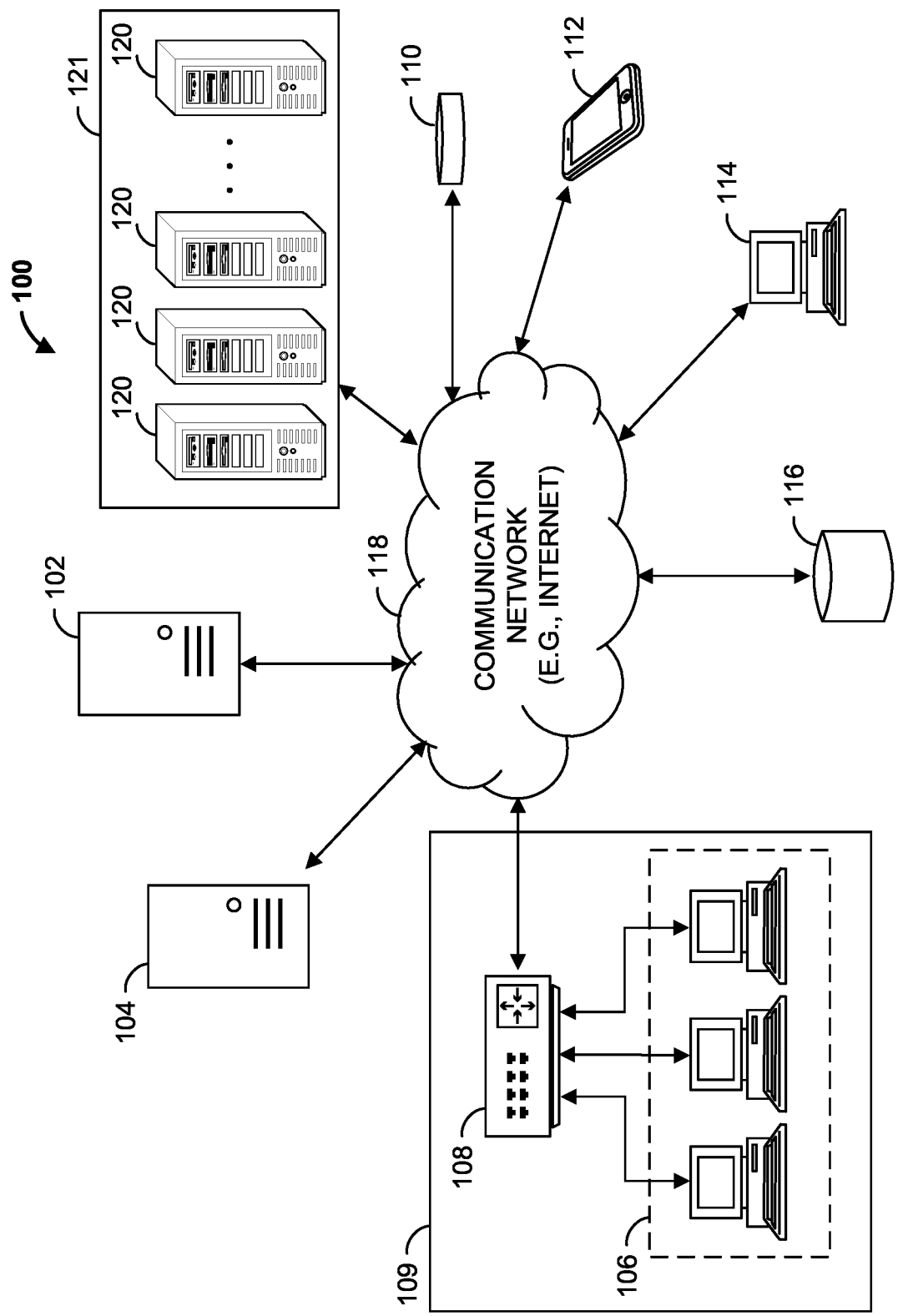
FIG. 1 is a network environment configured to provide post transaction seasonal item recommendations, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

In e-commerce, items can be recommended to users (e.g. online customers of a retailer) after the users place their orders online. For example, a recommendation system can remind customers to add seasonal items to their existing pickups during the post-transaction shopping journey. As such, a user can add more items into the placed order, e.g. based on these recommendations and before the order is shipped.

One goal of various embodiments in the present teaching is to improve customer experience by reminding them of upcoming seasons and recommending them seasonally relevant products based on post transaction behaviors, which emulates a store like experience for online customers. For example, on April 12, routine grocery customers will see Easter themed candy options available during their post-transaction shopping journey, e.g. when they want to amend their order or determine a store for picking up the ordered items. a disclosed recommendation system brings in automation to fill in the blanks with continuous recommendations. The system can provide more opportunity for sellers who specifically sell seasonal products, e.g. by measuring impact of season and allowing merchants to prepare and update items during an ongoing season. In addition, the system can remind users to add seasonally-relevant items to their carts, improving overall business metrics.

In some embodiments, the system can include one or more seasonal item recommendation models for post-transaction customer shopping journey. In some examples, the system can automatically identify seasonal time durations to provide seasonal items to customers. The models may be optimized for each of thousands of offline stores to showcase the best temporally and geographically relevant products to customers. A candidate pool may be created ahead of time for seasonal recommendations based on transactions of past years.

The system can improve item recommendations by having granular control over the items' seasonal rankings at an item level as well as a product type (PT) level. In some embodiments, the system performs fine-tuning, e.g. on the weights, of the PT level and item level seasonal scores. For example, the candy type in general is transacted throughout a year, and items specific to Halloween, e.g. the fancy costumes type, may have a higher seasonal score in Halloween than the candy type.

In some embodiments, the seasonal item recommendation is personalized for each user, e.g. based on the transaction order last placed by the user. In some embodiments, the system can detect seasonal variation within longer seasons. For example, different item recommendations are provided for every week, where items have different scores for each week and the scores are refreshed based on latest week transactions.

In some embodiments, the system can totally eliminate human effort to curate products for seasonal carousals and provide continuous seasonal item recommendations for customers in absence of merchant recommendations. In other embodiments, the system can combine merchant curations or recommendations with the disclosed automatic seasonal recommendations. The automation of seasonal recommendations can not only help merchants to highlight their seasonal products in season specific placements, but also allow merchants to refresh their item lists independently and improve the recommendation model overtime.

Furthermore, in the following, various embodiments are described with respect to methods and systems for post transaction seasonal item recommendations. In some embodiments, a current seasonal time window associated with a seasonal event and some seasonal product types is determined. Based on historical transaction data of the seasonal product types, a first seasonal index score is computed for each item, and a second seasonal index score is computed for each product type including one or more items. A seasonal rank score is generated for each item based on the first seasonal index score and the second seasonal index score, such that the items in the historical transaction data are ranked based on their respective seasonal rank scores. Based on the ranked items and a transaction order from a user, a list of recommended items is generated and displayed to the user.

Turning to the drawings, FIG. 1 is a network environment 100 configured to provide post transaction seasonal item recommendations, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, an item recommendation computing device 102 (e.g., a server, such as an application server), a web server 104, a cloud-based engine 121 including one or more processing devices 120, workstation(s) 106, a database 116, and one or more customer computing devices 110, 112, 114 operatively coupled over the network 118. The item recommendation computing device 102, the web server 104, the workstation(s) 106, the processing device(s) 120, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the item recommendation computing device 102 and processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, the cloud-based engine 121 may offer computing and storage resources of the one or more processing devices 120 to the item recommendation computing device 102.

In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more retailer websites. In some examples, the item recommendation computing device 102, the processing devices 120, and/or the web server 104 are operated by a retailer, and the multiple customer computing devices 110, 112, 114 are operated by customers of the retailer. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109, for example. The workstation(s) 106 can communicate with the item recommendation computing device 102 over the communication network 118. The workstation(s) 106 may send data to, and receive data from, the item recommendation computing device 102. For example, the workstation(s) 106 may transmit data identifying items purchased by a customer at the store 109 to item recommendation computing device 102.

Although FIG. 1 illustrates three customer computing devices 110, 112, 114, the network environment 100 can include any number of customer computing devices 110, 112, 114. Similarly, the network environment 100 can include any number of the item recommendation computing devices 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Each of the first customer computing device 110, second customer computing device 112, and Nth customer computing device 114 may communicate with the web server 104 over the communication network 118. For example, each of the multiple computing devices 110, 112, 114 may be operable to view, access, and interact with a website, such as a retailer's website, hosted by the web server 104. The web server 104 may transmit user session data related to a customer's activity (e.g., interactions) on the website. For example, a customer may operate one of customer computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the item recommendation computing device 102 over communication network 118. The website may also allow the operator to add one or more of the items to an online shopping cart, and allow the customer to perform a "checkout" of the shopping cart to purchase the items. In some examples, the web server 104 transmits purchase data identifying items the customer has purchased from the website to the item recommendation computing device 102.

In some examples, the item recommendation computing device 102 may execute one or more models (e.g., algorithms), such as a machine learning model, deep learning model, statistical model, etc., to determine recommended items to advertise to the customer (i.e., item recommendations). The item recommendation computing device 102 may transmit the item recommendations to the web server 104 over the communication network 118, and the web server 104 may display advertisements for one or more of the recommended items on the website to the customer. For example, the web server 104 may display the recommended items to the customer on a homepage, a catalog webpage, an item webpage, a search results webpage, or a post-transaction webpage of the website (e.g., as the customer browses those respective webpages).

In some examples, the web server 104 transmits a recommendation request to the item recommendation computing device 102. The recommendation request may be sent together with a search query provided by the customer (e.g., via a search bar of the web browser), or a standalone recommendation query provided by a processing unit in response to the user's action on the website, e.g. interacting (e.g., engaging, clicking, or viewing) with one or more items, adding one or more items to cart, or purchasing one or more items.

In one example, a customer selects an item on a website hosted by the web server 104, e.g. by clicking on the item to view its product description details, by adding it to shopping cart, or by purchasing it. The web server 104 may treat the item as an anchor item or query item for the customer, and send a recommendation request to the item recommendation computing device 102. In response to receiving the request, the item recommendation computing device 102 may execute the one or more processors to determine recommended items that are related (e.g. substitute or complementary) to the anchor item, and transmit the recommended items to the web server 104 to be displayed together with the anchor item to the customer.

In another example, a customer submits a search query on a website hosted by the web server 104, e.g. by entering a query in a search bar. The web server 104 may send a recommendation request to the item recommendation computing device 102. In response to receiving the request, the item recommendation computing device 102 may execute the one or more processors to first determine search results including items matching the search query, and then determine recommended items that are related to one or more top items in the search results. The item recommendation computing device 102 may transmit the recommended items to the web server 104 to be displayed together with the search results to the customer.

In yet another example, a customer places an order on a website hosted by the web server 104 at a time during a festival season, e.g. November 20 during the Thanksgiving season. The web server 104 may send a recommendation request to the item recommendation computing device 102 with a note of the date or the season. In response to receiving the request, the item recommendation computing device 102 may execute the one or more processors to first determine seasonal items relevant to the Thanksgiving season, and then rank them based on seasonal index scores to generate a ranked list of recommended seasonal items. The item recommendation computing device 102 may filter the ranked list, e.g. based on availability of items in a pick-up store selected by the customer, and transmit the filtered list of recommended items to the web server 104 to be displayed to the customer, which may trigger the customer add more items to the order or place another order.

The item recommendation computing device 102 is further operable to communicate with the database 116 over the communication network 118. For example, the item recommendation computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the item recommendation computing device 102, in some examples, the database 116 can be a local storage device, such as a hard drive, a non-volatile memory, or a USB stick. The item recommendation computing device 102 may store purchase data received from the web server 104 in the database 116. The item recommendation computing device 102 may also receive from the web server 104 user session data identifying events associated with browsing sessions, and may store the user session data in the database 116.

In some examples, the item recommendation computing device 102 generates training data for a plurality of models (e.g., machine learning models, deep learning models, statistical models, algorithms, etc.) based on historical user session data, purchase data, and current user session data for the users. The item recommendation computing device 102 trains the models based on their corresponding training data, and the item recommendation computing device 102 stores the models in a database, such as in the database 116 (e.g., a cloud storage).

The models, when executed by the item recommendation computing device 102, allow the item recommendation computing device 102 to determine item recommendations for one or more items to advertise to a customer. For example, the item recommendation computing device 102 may obtain the models from the database 116. The item recommendation computing device 102 may then receive, in real-time from the web server 104, current user session data identifying real-time events of the customer interacting with a website (e.g., viewing a webpage before or after placing a transaction order). In response to receiving the user session data, the item recommendation computing device 102 may execute the models to determine item recommendations for items to display to the customer. The user session data may identify actions (e.g., activity) of the customer on a website. For example, the user session data may identify item impressions, item clicks, items added to an online shopping cart, items purchased in an order, conversions, click-through rates, advertisements viewed, and/or advertisements clicked during an ongoing browsing session (e.g., the user data identifies real-time events).

In some examples, the item recommendation computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, item recommendation computing device 102 may generate ranked item recommendations for items to be displayed on the website.

Among other advantages, the embodiments allow for automatic and accurate seasonal item recommendations that may remind a customer to shop items related to a shopping season involving a seasonal event. In various embodiments, the seasonal event may be a season, a holiday, a festival, a sporting event, a social event, or any seasonal event that is capable of affecting shopping behaviors of the customers.

Figure 2:
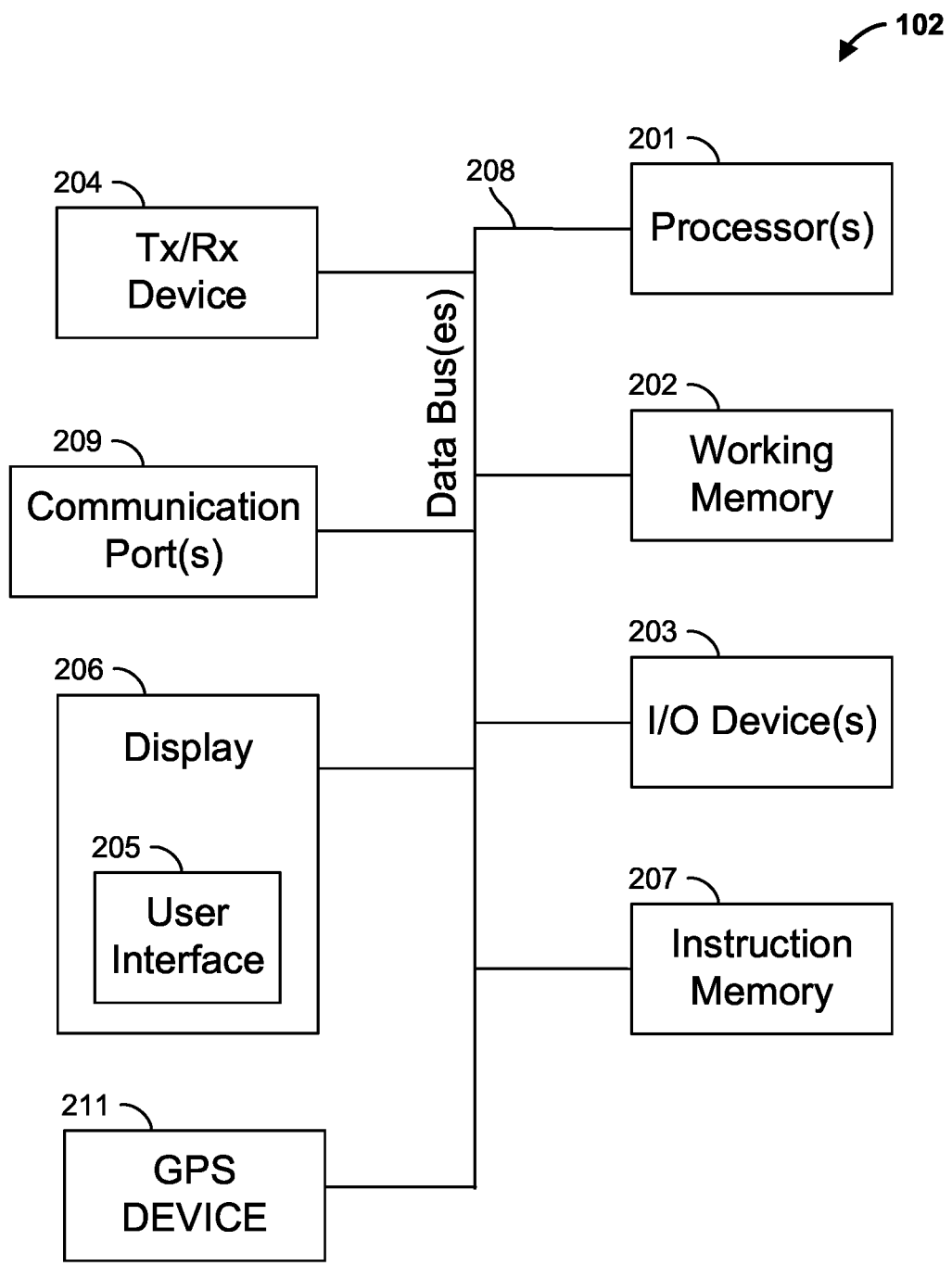
FIG. 2 is a block diagram of an item recommendation computing device, in accordance with some embodiments of the present teaching.

FIG. 2 illustrates a block diagram of an item recommendation computing device, e.g. the item recommendation computing device 102 of FIG. 1, in accordance with some embodiments of the present teaching. In some embodiments, each of the item recommendation computing device 102, the web server 104, the workstation(s) 106, the multiple customer computing devices 110, 112, 114, and the one or more processing devices 120 in FIG. 1 may include the features shown in FIG. 2. Although FIG. 2 is described with respect to the item recommendation computing device 102. It should be appreciated, however, that the elements described can be included, as applicable, in any of the item recommendation computing device 102, the web server 104, the workstation(s) 106, the multiple customer computing devices 110, 112, 114, and the one or more processing devices 120.

As shown in FIG. 2, the item recommendation computing device 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUS), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the item recommendation computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the item recommendation computing device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the item recommendation computing device 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the item recommendation computing device 102 may determine a local geographical area (e.g., town, city, state, etc.) of its position. Based on the geographical area, the item recommendation computing device 102 may determine relevant trend data (e.g., trend data identifying events in the geographical area).

Figure 3:
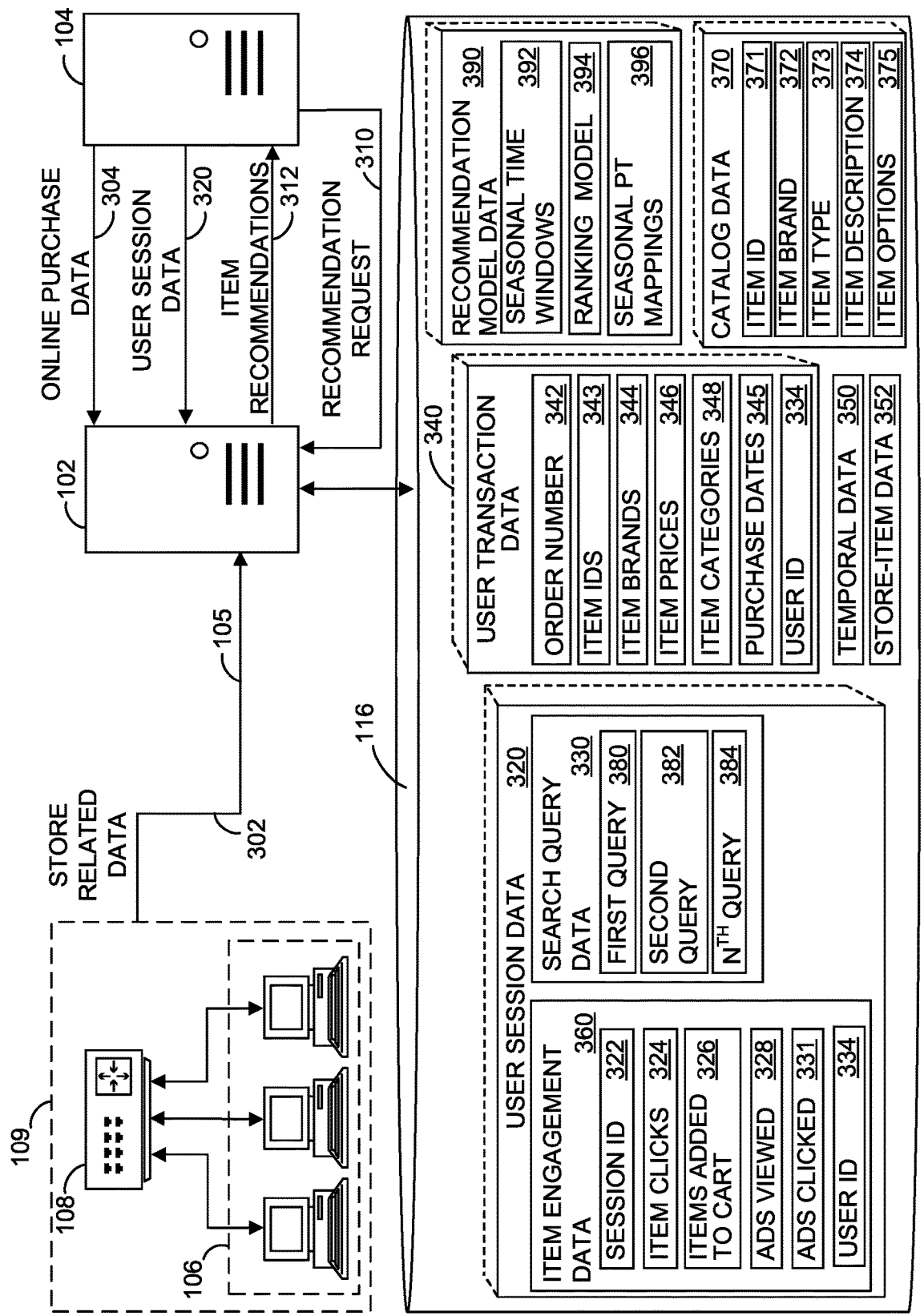
FIG. 3 is a block diagram illustrating various portions of an item recommendation system, in accordance with some embodiments of the present teaching.

FIG. 3 is a block diagram illustrating various portions of an item recommendation system, e.g. the item recommendation system shown in the network environment 100 of FIG. 1, the in accordance with some embodiments of the present teaching. As indicated in FIG. 3, the item recommendation computing device 102 may receive user session data 320 from the web server 104, and store the user session data 320 in the database 116. The user session data 320 may identify, for each user (e.g., customer), data related to that user's browsing session, such as when browsing a retailer's webpage hosted by the web server 104.

In some examples, the user session data 320 may include item engagement data 360 and/or search query data 330. The item engagement data 360 may include one or more of a session ID 322 (i.e., a website browsing session identifier), item clicks 324 identifying items which a user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.).

The search query data 330 may identify one or more searches conducted by a user during a browsing session (e.g., a current browsing session). For example, the item recommendation computing device 102 may receive a recommendation request 310 from the web server 104, where the recommendation request 310 may be associated with a search request that identifies one or more search terms provided by the user. The item recommendation computing device 102 may store the search terms as provided by the user as search query data 330. In this example, the search query data 330 includes first query 380, second query 382, and Nth query 384.

The item recommendation computing device 102 may also receive online purchase data 304 from the web server 104, which identifies and characterizes one or more online purchases, such as purchases made by the user and other users via a retailer's website hosted by the web server 104. The item recommendation computing device 102 may also receive store related data 302 from the store 109, which identifies and characterizes one or more in-store purchases. In some embodiments, the store related data 302 may also indicate availability of items in the store 109, and/or user IDs that have selected the store 109 as a default store for picking up online orders.

The item recommendation computing device 102 may parse the store related data 302 and the online purchase data 304 to generate user transaction data 340. In this example, the user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item categories 348 identifying a category of each item purchased, a purchase date 345 identifying the purchase date of the purchase order, and user ID 334 for the user making the corresponding purchase.

The database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., different product types such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store recommendation model data 390 identifying and characterizing one or more recommendation models and related data. For example, the recommendation model data 390 may include seasonal time windows 392, a ranking model 394, and seasonal product type (PT) mappings 396. The ranking model 394 may be used to rank recommended items based on seasonal ranking scores, which are calculated based on the seasonal time windows 392 and the seasonal PT mappings 396. In various embodiments, the seasonal time windows 392 may identify time windows of different seasonal events that are capable of affecting users' shopping behaviors. In various embodiments, the seasonal PT mappings 396 may indicate keywords of product types that are related to different seasonal events.

In some examples, the database 116 may further store temporal data 350 and store-item data 352. The temporal data 350 may identify a current date (e.g., a date range), known or predicted dates of various seasonal events (e.g., festival dates, sport event dates, local event dates, weather change dates, seasonal change dates, natural disaster dates, etc.), or any other suitable time period. The store-item data 352 may identify store-level availability of each item.

In some examples, the item recommendation computing device 102 receives (e.g., in real-time) the user session data 320 for a customer interacting with a website hosted by the web server 104. In response, the item recommendation computing device 102 generates item recommendation 312 identifying recommended items to advertise to the customer, and transmits the item recommendation 312 to the web server 104.

In some examples, the recommendation request 310 may be associated with an order of a user, e.g. after the user placed the order on a website of a retailer. In response, the item recommendation computing device 102 generates recommended items that are popular to a current season. The current season may be determined based on a current time/date falling within one of the seasonal time windows 392. The seasonal time windows 392 may be pre-determined by the item recommendation computing device 102 based on the seasonal PT mappings 396 and historical transaction data and historical search query data, e.g. during last one or more years.

Then, the item recommendation computing device 102 may rank the seasonal recommended items based on their seasonal ranking scores according to the ranking model 394. The item recommendation computing device 102 may also filter the ranked recommended items, e.g. based on the store-item data 352, to remove items that are unavailable in a store where the user will pick up the order. In some embodiments, the filtered list of seasonal recommended items may be combined with another list of recommended items that are generated based on merchants' manual curations, to generate a final list of item recommendations 312. The item recommendation computing device 102 may transmit the final list of item recommendations 312 to the web server 104 to be displayed to the user.

In some embodiments, the item recommendation computing device 102 may assign one or more of the above described operations to a different processing unit or virtual machine hosted by one or more processing devices 120. Further, the item recommendation computing device 102 may obtain the outputs of the these assigned operations from the processing units, and generate the ranked item recommendations 312 based on the outputs.

Figure 4:
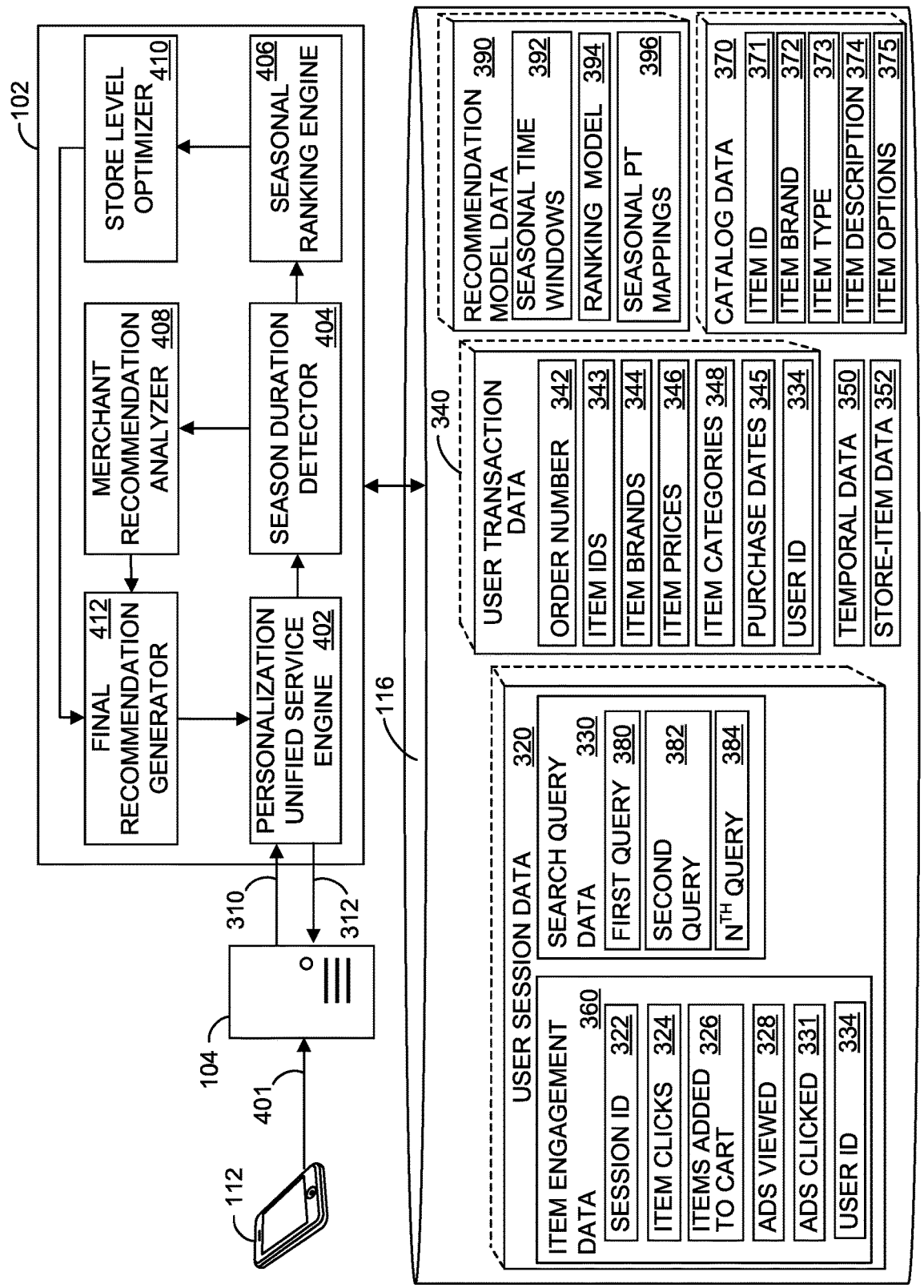
FIG. 4 is a block diagram illustrating various portions of an item recommendation computing device, in accordance with some embodiments of the present teaching.

FIG. 4 is a block diagram illustrating a more detailed view of an item recommendation computing device, e.g. the item recommendation computing device 102 in FIG. 1, in accordance with some embodiments of the present teaching. As shown in FIG. 4, the item recommendation computing device 102 includes a personalization unified service engine 402, a season duration detector 404, a seasonal ranking engine 406, a merchant recommendation analyzer 408, a store level optimizer 410, and a final recommendation generator 412. In some examples, one or more of the personalization unified service engine 402, the season duration detector 404, the seasonal ranking engine 406, the merchant recommendation analyzer 408, the store level optimizer 410 and the final recommendation generator 412 are implemented in hardware. In some examples, one or more of the personalization unified service engine 402, the season duration detector 404, the seasonal ranking engine 406, the merchant recommendation analyzer 408, the store level optimizer 410 and the final recommendation generator 412 are implemented as an executable program maintained in a tangible, non-transitory memory, such as instruction memory 207 of FIG. 2, which may be executed by one or processors, such as processor 201 of FIG. 2.

For example, the personalization unified service engine 402 may obtain from the web server 104 a recommendation request 310 as a message 401 is sent from the user device 112 to the web server 104, and may execute recommendation model(s) included in the recommendation model data 390. The message 401 sent by the user using the user device 112 may indicate a search query or an online order submitted by the user. The recommendation request 310 may either include information about the order, or indicate the order information in the user transaction data 340. In some embodiments, the recommendation request 310 is to seek one or more recommended items that are relevant to a current season and can remind the user to add more seasonally relevant items to the order.

In this example, the web server 104 transmits a recommendation request 310 to the item recommendation computing device 102. The recommendation request 310 may include a request for item recommendations for presentation to a particular user using the user device 112. In some examples, the recommendation request 310 further identifies a user (e.g., customer) for whom the item recommendations are requested at the web server 104. The personalization unified service engine 402 receives the recommendation request 310, and receives and parses the user session data 320 (e.g., user session data associated with a current user session of the user in real-time). The personalization unified service engine 402 may provide to the season duration detector 404 the user session data 320, and/or other data, which may include the user transaction data 340, the temporal data 350, and the seasonal PT mappings 396 extracted from the database 116.

In some embodiments, the season duration detector 404 can obtain transaction data identifying transactions of users of the website hosted by the web server 104, e.g. for the last two years. The season duration detector 404 may also obtain search query data identifying search queries of users of the website, e.g. for the last two years. The season duration detector 404 may further obtain the temporal data 350 identifying known or predicted seasonal event dates, and the seasonal PT mappings 396 identifying product types related to different seasonal events. The season duration detector 404 may obtain each of these data either from the personalization unified service engine 402 or from the database 116.

Based on these data, the season duration detector 404 can determine season durations for different seasonal events (e.g. festivals), to generate and store the seasonal time windows 392 in the database 116. Each of the seasonal time windows 392 represents a time period associated with a respective seasonal event. For example, a seasonal time window may start from 4 weeks before the respective seasonal event and end 2 days after the respective seasonal event. The season duration detector 404 may send information about the seasonal time windows 392 to the seasonal ranking engine 406 for computing seasonal rankings, and to the merchant recommendation analyzer 408 for season validation.

In some embodiments, the seasonal ranking engine 406 can determine a current season (or seasonal event) based on the seasonal time windows 392 and a current date. Then the seasonal ranking engine 406 may compute a seasonal ranking score for each item in product types that are predetermined to be relevant to the current season. For example, the seasonal ranking engine 406 may aggregate historical transaction data of the relevant product types by week, and compute seasonal index scores for each week at both item level and product type (PT) level. Then, the seasonal ranking engine 406 may combine the seasonal index scores using some fine-tuning parameters to generate a seasonal ranking score for each item. The seasonal ranking engine 406 may rank the items based on their respective seasonal ranking scores to generate top k seasonal items, where k is a predetermined positive integer. Then, the seasonal ranking engine 406 may send a ranked list of the top k seasonal items to the store level optimizer 410 for store level optimization.

In some embodiments, the store level optimizer 410 can optimize the item recommendations output by the seasonal ranking engine 406 based on information related to the customer (who placed the order on the website), the store (where the customer will pick up the placed order), and/or the retailer (which owns the website and the store). For example, among the recommended items by the seasonal ranking engine 406, the store level optimizer 410 can filter out items that are not currently being sold by the retailer, and filter out items that are not currently available (e.g. out of stock) at the store, e.g. based on the store-item data 352. In addition, the store level optimizer 410 may determine the customer's consideration intent based on the items in the placed order, e.g. based on the user transaction data 340. The consideration intent may indicate what type of items (e.g. high value or low value) the customer is interested in during the current shopping journey. Among the recommended items by the seasonal ranking engine 406, the store level optimizer 410 may further filter out items that do not match the customer's consideration intent. In some embodiments, the store level optimizer 410 can generate and transmit a filtered or optimized list of recommended seasonal items to the final recommendation generator 412.

In some embodiments, the merchant recommendation analyzer 408 can analyze item recommendations from merchants on the website. For example, a merchant may generate a list of items, and schedule the list of items to be published and offered for purchase on the website starting from a specific date (or within a specific time period). But the list of items may or may not be seasonally relevant. First, the merchant recommendation analyzer 408 may analyze the list of items and validate that one or more items in the list are relevant to a seasonal time window obtained from the season duration detector 404. Then, the merchant recommendation analyzer 408 can rank the validated items based on trending scores, which may be generated based on latest transaction data e.g. in the last month. The merchant recommendation analyzer 408 can also filter out items that do not match the customer's consideration intent. As such, the merchant recommendation analyzer 408 can generate and transmit another filtered list of recommended items to the final recommendation generator 412.

In some embodiments, the final recommendation generator 412 can combine the two lists of recommended items obtained from the store level optimizer 410 and the merchant recommendation analyzer 408, respectively. In some embodiments, the final recommendation generator 412 may give priority to one of the two lists of recommended items. In some embodiments, the final recommendation generator 412 may intersperse the two lists of recommended items to generate a final ordered list of recommended items. The final recommendation generator 412 may generate the item recommendations 312 based on the final ordered list of recommended items. In some embodiments, the final recommendation generator 412 may generate data that identifies the order of the item recommendations 312 associated with the particular user to optimize user interactions with and user purchases of items in the recommendations.

The personalization unified service engine 402 may receive the item recommendations 312 from the final recommendation generator 412 in a data format (e.g., message) acceptable by web server 104. The personalization unified service engine 402 transmits the item recommendations 312 to web server 104. The web server 104 may then update or generate item recommendations for presentation to the user via the user device 112 based on the item recommendations 312. For example, the item recommendations may be displayed on a webpage showing the placed order to the user, on a webpage showing a function to select a pick-up store for the placed order, and/or on a webpage showing an option to amend the placed order or add more items into the placed order.

Figure 5:
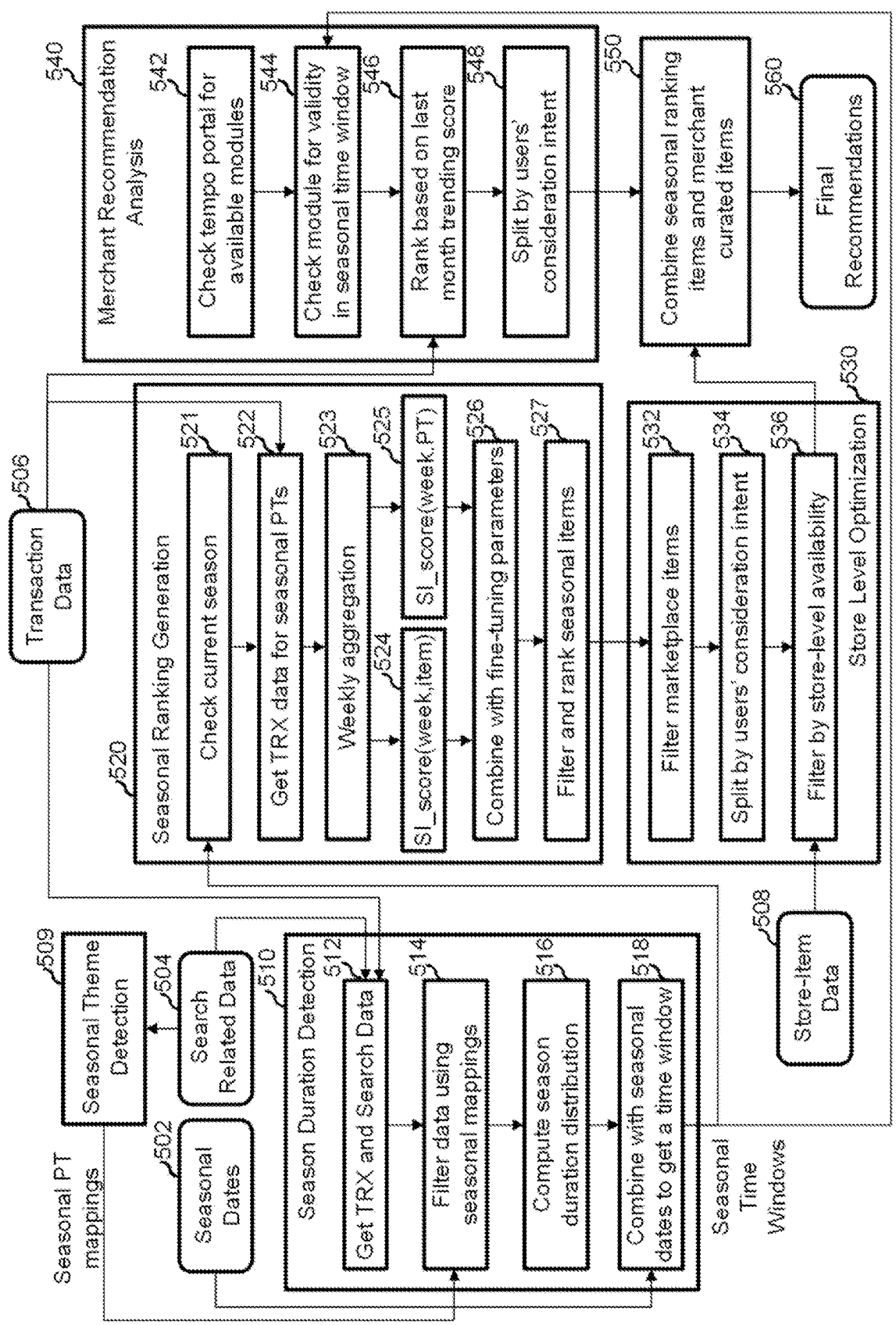
FIG. 5 illustrates a process for providing post transaction seasonal item recommendations, in accordance with some embodiments of the present teaching.

FIG. 5 illustrates an exemplary process for providing post transaction seasonal item recommendations, in accordance with some embodiments of the present teaching. As shown in FIG. 5, the process includes several sub-processes, e.g. a season duration detection 510, a seasonal ranking generation 520, a store level optimization 530, a merchant recommendation analysis 540, and a final recommendation generation operation 550.

In some embodiments, the season duration detection 510 can automatically generate time bounds for the duration of each season using transaction and search queries based on past customer behavior. An algorithm, e.g. Algorithm 1 below, may be used to cluster over normalized data to find the best grouping of days around the season. The average duration of season may be used to calculate starting and ending time/date of upcoming seasons. to

---

Algorithm 1: Season Duration Detection

An algorithm that determines the time duration of a festival from historical data using the day of year and the corresponding count of search queries. Could be expanded to use the count of relevant festival transactions as well to reduce variance in time windows.

---

Data: $T = \{t^y_{halloween}, t^y_{chrismas}, \dots\}$ where $t_f$ is the day of year t of festival f in current year y -continued Algorithm 1: Season Duration Detection
An algorithm that determines the time duration of a festival from
historical data using the day of year and the corresponding count of
search queries. Could be expanded to use the count of relevant
festival transactions as well to reduce variance in time windows.

$X_f = [\vec{x}_f^1, \ldots, \vec{x}_f^{365}]$ where $\vec{x} = (i, n, m)$ is the relevant count of seasonal/
festival search queries n and seasonal transactions m for the each day of
the year i and festival f
K = k where k is the number of clusters
Result: $(t_f^{start}, t_f^{end})$
for t in T: do
   1) Initialize cluster centroids $\mu_1, \ldots, \mu_k \in \mathbb{R}^n$
   2) Repeat until convergence (centroids do not change)
   for i in 1, 2, ..., 366: do
     | set $c^i := \text{argmin}_j \|x^i - \mu_j\|^2$
   end
   for j in 1, 2, ..., k: do
     | set $\mu^j := \sum_{i=1}^m 1_{c^i = j} x^i$
   end
   3) Determine $(t^{start}, t^{end})$
   Select $c^f$ where $t_f^{y-1} \in c^j$ as the festival cluster
   Select $t_f^{y-1}$ $\min_i$, $\max_i - t_f^{y-1}$ from $c^f$ as (daysbefore, daysafter)
   Average over all years of available data
   4) Combine current year's festival date with calculated time duration
   $(t_f^y - \text{avg}(daysbefore), \text{avg}(daysafter) + t_f^y)$
end In some embodiments, the season duration detection 510 in FIG. 5 may be part of the functions performed by the season duration detector 404 in FIG. 4, and/or can be implemented by the item recommendation computing device 102 in FIG. 1. As shown in FIG. 5, the season duration detection 510 starts from operation 512, where historical interaction data of users are obtained. In some embodiments, the historical interaction data may include historical transaction (TRX) data and historical search related data over the latest one or more years, e.g. over the last two years. The historical transaction data may be obtained from the transaction data 506, which may include data related to user transactions both in stores and online, like the user transaction data 340 in FIG. 3. The historical search related data may be obtained from the search related data 504, which may include data about search query and user clicks related to searching operations of the users, as in the search query data 330 and the item engagement data 360 in FIG. 3 respectively.

Then, at operation 514, the historical interaction data may be filtered based on seasonal product type (PT) mappings. In some embodiments, the seasonal PT mappings include keywords that are generated from a seasonal theme detection 509. In some embodiments, the seasonal theme detection 509 is a process to determine keywords that are associated with at least one seasonal event, e.g. based on the search related data 504 of users. For example, based on the numbers of different search queries submitted by the users at different seasonal events or in association with different seasonal events (e.g. a query including both a product and a seasonal event), keywords of product types related to different seasonal events can be determined during the seasonal theme detection 509 based on iterative clustering. For example, Christmas trees and Christmas decorations may be determined to be related to the Christmas season.

In some embodiments of the seasonal theme detection 509, search query data and click data of users may be utilized to form a bipartite graph filtered with keywords related to a season. Then iterative clustering may be implemented on the graph to learn clusters of queries and corresponding product set with a score. The top m PT clusters may be used as seasonal PT for the season to generate corresponding keywords, where m is a positive integer.

These keywords of product types may be utilized to filter the historical interaction data at operation 514. In various embodiments, the product types of different items may be obtained by the seasonal theme detection 509 from the catalog data 370 in FIG. 4. In various embodiments, the seasonal theme detection 509 may be implemented by the item recommendation computing device 102 in FIG. 1, or by another device coupled to the network cloud 118 in FIG. 1.

In some embodiments, a season duration distribution is computed for each seasonal event at operation 516 based on the filtered historical interaction data. The season duration distribution may be a frequency distribution of interactions (of product types related to the seasonal event) across time. At operation 518, the season duration distributions are combined with seasonal dates 502 of different seasonal events to determine season durations for the seasonal events. Each date in the seasonal dates 502 may be a known or predicted date or date range for a corresponding seasonal event. Each season duration may correspond to a seasonal time window, including dates around a corresponding seasonal event.

In some embodiments, for each of a plurality of seasonal events, a respective seasonal time window is determined based on the frequency distribution of interactions and a pre-known date of the seasonal event. For example, based on a known date of a festival and a frequency distribution of interactions of the product types pre-determined to be related to the festival, one or more thresholds can be applied on the distribution over time to obtain a time range or time window. The thresholds may be determined based on both the frequency distribution and the festival date. For example, a hard filter may be applied on either side of the frequency distribution of transactions to filter out time periods when the transaction frequency or transaction quantity is lower than a predetermined threshold. In some examples, the threshold on either side may be determined based on iterative clustering. As such, the season duration detection 510 may generate a plurality of seasonal time windows each of which represents a time period associated with a respective seasonal event. In some embodiments, each seasonal events is at least one of: a season, a holiday, a festival, a sporting event, a social event, or another seasonal event that is capable of affecting shopping behaviors of users of a retailer. In some embodiments, the seasonal time windows output by the season duration detection 510 may be stored in a database, e.g. as the seasonal time windows 392 in the database 116 in FIG. 3. In some embodiments, the seasonal time windows output by the season duration detection 510 may have different time lengths. For example, a seasonal time window for a popular festival, like Thanksgiving or Christmas, may have a time length of more than a month; while a seasonal time window for other festivals, like Valentine's Day or Mother's Day, may have a time length of one or two weeks.

In some embodiments, the seasonal ranking generation 520 may aggregate transactions in weekly time windows for item transactions over a year. The transactions can be used to calculate seasonal index (SI) scores over product-type (PT) level and item level for each week. An algorithm may be used to combine the PT level and item level SI scores to create a seasonal rank (SR) score using one or more parameters.

In some embodiments, the seasonal ranking generation 520 in FIG. 5 may be part of the functions performed by the seasonal ranking engine 406 in FIG. 4, and/or can be implemented by the item recommendation computing device 102 in FIG. 1. As shown in FIG. 5, the seasonal ranking generation 520 starts from operation 521, where a current season is determined. In some embodiments, a seasonal time window corresponding to the current season is determined based on a current time and the seasonal time windows obtained from the season duration detection 510. For example, when a current date falls within one of the seasonal time windows, the current seasonal time window is determined accordingly.

Then, a plurality of seasonal product types associated with the current seasonal time window is determined, e.g. based on the seasonal PT mappings generated by the seasonal theme detection 509. In some embodiments, the seasonal PT mappings are sent directly from the seasonal theme detection 509 to the seasonal ranking generation 520. In other embodiments, the seasonal PT mappings are forwarded with the seasonal time windows from the season duration detection 510 to the seasonal ranking generation 520.

Based on the determined seasonal product types, historical transactions of the seasonal product types are obtained at operation 522 from the transaction data 506. For example, the transactions during last one or more years can be obtained for all seasonal product types predetermined to be related to a current festival season, determined from the operation 521.

At operation 523, the historical transaction data may be aggregated by week to generate weekly transaction data of items in the seasonal product types. Based on the weekly transaction data, a first weekly seasonal index score is computed at operation 524 for each item and each week, and a second weekly seasonal index score is computed at operation 525 for each product type and each week. In some embodiments, each first weekly seasonal index score measures a percentage of transactions of a respective item within a respective week among total transactions of the respective item over one year; while each second weekly seasonal index score measures a percentage of transactions of items in a respective product type within a respective week among total transactions of the items in the respective product type over one year.

In some embodiments, a product-type level seasonal index score may be computed based on the following Algorithm 2. For example, taking the time period t in Algorithm 2 to be a month, the number of transactions may be calculated for each product type and each month for one year, e.g. the past year. The total number of transactions for that product type in that year can also be calculated. The seasonality index score may be computed for each product type and each month for that year. The process can be repeated to generate scores for each of the past years, such that a mean can be taken on the scores to generate a final seasonality index score for each product type and each month. For each month, the system can sort the SI score for each product type to get the top seasonal product types for the month.

---
Algorithm 2:
---
Time period → t, Number of days in t → d
product_types → [pt₁, pt₂, ..., ptₛ]
Number of years of transaction data available → q ---
Algorithm 2:
---
For pt in product_types:
  For y in q:
    No. of transactions for product type pt during
    time period t and year → $n_{t,y}$
    Compute seasonality index score for product type pt during time period t and year $$y \rightarrow SI_y = \frac{n_{t,y}}{\sum_{i=1}^{365/d} n_{i,y}}$$

Compute seasonality index for product type pt and time period $$t \rightarrow \frac{\sum_{y=2}^{q} SI_y}{q}$$

Sort the product type seasonality index scores in descending order to get top k seasonal pts during the time period t.

---

The item-level seasonal index score can also be computed similarly, e.g. by replacing different product types in Algorithm 2 with different items.

Then the first seasonal index score and the second seasonal index score may be combined at operation 526, e.g. using some fine-tuning parameters, to generate a seasonal rank score for each item in the historical transaction data obtained from the operation 522.

In some embodiments, the seasonal rank score is generated based on a weighted sum of the first weekly seasonal index score and the second weekly seasonal index score. In some examples, a first weight associated with the first weekly seasonal index score may be computed for each item and each week. The first weight represents a percentage of transactions of a respective item among total transactions of all items within a respective week. In some examples, a second weight associated with the second weekly seasonal index score may be computed for each item and each week. The second weight represents a percentage of transactions of a respective product type among total transactions of all product types within a respective week. The weighted sum of the first weekly seasonal index score and the second weekly seasonal index score may be computed based on the first weight and the second weight.

In some examples, the time period in Algorithm 2 is taken as a week, represented as w. At the product type level, different product types are represented as $[pt_1, pt_2, \ldots, pt_s]$, where S represents the total number of product types in the obtained transaction data. At the item level, different items are represented as $[item_1, item_2, \ldots, item_N]$, where N represents the total number of items in the obtained transaction data. The seasonal index (SI) score at the product type level is represented as $SI_{\{pt,w\}}$; while the SI score at the item level is represented as $SI_{\{item,w\}}$:

The operation 526 may combine the two SI scores using granular control parameters $\alpha$ and $\beta$, to compute the seasonal rank (SR) score as shown in Equation (1) below.

$$SR_{\{item,w\}} = \alpha SI_{\{pt,w\}} + \beta SI_{\{item,w\}} \tag{1}$$

In various embodiments, the parameters a and B can be fine-tuned according to different equations. In some examples, the initial values for parameters $\alpha$ and $\beta$ can be one, i.e. $\alpha=1$ and $\beta=1$.

In some examples, a global value apt with respect to each product type can be used for a in Equation (1), following $$\alpha_{pt} = \frac{n_{\{pt\}}}{\sum_{pt=1}^{S} n_{\{pt\}}}, \text{ where } n_{\{pt\}} = \sum_{w=1}^{52} n_{\{pt,w\}},$$

and $n_{\{pt,w\}}$ represents the number of transactions by product type pt in week w.

In some examples, a weekly value $\alpha_{pt,w}$ with respect to each product type and each week can be used for a in Equation (1), following $$\alpha_{pt,w} = \frac{n_{\{pt,w\}}}{\sum_{pt=1}^{S} n_{\{pt,w\}}}.$$

Similarly, β can also be taken as either a global value or weekly value for Equation (1). For example, the item-level global value for β can be computed as $$\beta_{item} = \frac{n_{\{item\}}}{\sum_{item=1}^{N} n_{\{item\}}},$$

where $n_{(item)} = \sum_{w=1}^{52} n_{(item,w)}$, and $n_{(item,w)}$ represents the number of transactions of item in week w. In these examples for computing SI and SR scores with parameters a and B, a year is divided into 52 weeks in order. In some embodiments, the computation of SI and SR scores takes place weekly in order, e.g. for each current week, to update a one year (52 weeks) time window data. For example, current week transactions will be used for the calculation for next week, and the corresponding week from last year is removed and updated from the one year time window data. In each week, SI may be calculated first and SR may be calculated based on SI for the same week.

In some embodiments, additional scores, like a seasonal theme score (ST score), may also be computed for each product type and each week, e.g. by the seasonal theme detection 509 based on search related data 504 of users. A higher ST score for an item may represent a higher search frequency and/or click frequency for keywords related to the item. In some examples, the seasonal rank (SR) score may be computed based on a weighted sum of: the first weekly seasonal index score, the second weekly seasonal index score, the seasonal theme score, and maybe other additional scores, as shown in Equation (2).

$$SR = \alpha SI_{\{pt,w\}} + \beta SI_{\{item,w\}} + \gamma STscore + \ldots \quad (2)$$

At operation 527, the items in each product type of the historical transaction data are filtered to remove items whose transaction quantity is less than a threshold. In some examples, the threshold may be determined based on a median quantity of transactions of the items in the historical transaction data. In some embodiments, the items in each product type of the historical transaction data are further filtered at operation 527 to remove items whose customer review quantity is less than a second threshold. In some examples, the second threshold may be determined based on a median quantity of reviews of the items in the historical transaction data. This can avoid getting into recommendations items that have very low reviews or very low transactions, as it is better to recommend items that are being sold popularly as well as highly seasonally relevant.

Further at operation 527, the filtered items are ranked based on their respective seasonal rank scores, to determine e.g. top K items ranked based on their respective seasonal rank scores, where K may be a predetermined positive integer. In some embodiments, a list of the top K items may be stored in a database, e.g. the database 116 in FIG. 1, as a candidate pool for seasonal item recommendations in a current time period, e.g. a current week or the current season. The candidate pool can also be used for the same season in future years. In some embodiments, the list of the top K items may also be sent to the store level optimization 530 after a transaction order is obtained from a user device of a user.

In some embodiments, the store level optimization 530 may keep top performing/trending items over last year and surface seasonal items that users are most likely to purchase from a given store. The store level optimization 530 can also split the item recommendations into multiple carousals based on consideration intent and their most likely transaction store.

In some embodiments, the store level optimization 530 in FIG. 5 may be part of the functions performed by the store level optimizer 410 in FIG. 4, and/or can be implemented by the item recommendation computing device 102 in FIG. 1. As shown in FIG. 5, the store level optimization 530 starts from operation 532, where the top K items are filtered to generate a first filtered list of items that are offered for purchase by the retailer. In case the top K items include some items that are not currently being sold by the retailer (out of stock or only sold by a third party on the website of the retailer), these items are filtered out at operation 532. The top K items may be either directly received from the output of the seasonal ranking generation 520, or retrieved from a database, e.g. the database 116 in FIG. 1.

At operation 534, the first filtered list of items output from the operation 532 is split into multiple groups based on users' consideration intent. In some examples, the first filtered list of items are split into two groups: a low consideration group including low consideration items, and a high consideration group including high consideration items. The low consideration items include items that are of relatively low value and usually bought in a routine or grocery shopping journey, e.g. vegetables, fruits. The high consideration items include items that are of relatively high value, e.g. computers, televisions.

In one example, during a "back to school" seasonal event, a pool of seasonal items generated based on the seasonal ranking generation 520 may include both a low consideration group including items like paper notebooks, pencils, rollerball pens, pencil cases; and a high consideration group including items like backpacks, laptop computers, desktop computers, tablet computers, desks, chairs. One seasonal time window associated with the "back to school" seasonal event may be determined to be a time period from July $20^{th}$ to August $31^{st}$. As such, if a transaction order is placed by a user during this seasonal time window, a consideration intent of the user is determined based on items in the transaction order, to be either low consideration or high consideration. When the items in the basket (or placed transaction order) are mostly low consideration items, the low consideration group is picked for the user to recommend more low consideration items during the post transaction shopping journey of the user. When the items in the basket are mostly high consideration items, the high consideration group is picked for the user to recommend more high consideration items during the post transaction shopping journey of the user.

As such, based on the consideration intent of the user, the first filtered list of items can be filtered to generate a second filtered list of items that match the user's consideration intent. In some embodiments, the different groups (e.g. low consideration group, high consideration group) of items split from the operation 534 may be stored in a database, e.g. the database 116 in FIG. 1, such that they can be re-used for item recommendations during different users' post transaction journey over a current time period, e.g. a current week or the current season.

Then at operation 536, the second filtered list of items output by the operation 534 may be further filtered based on store-level availability. In some examples, a pick-up store of the retailer is determined for the user to pick up items of the placed transaction order, e.g. based on the store-item data 508, which may include data of item availability at each store of the retailer, like the store-item data 352 in FIG. 3. The pick-up store may be determined based on: a default setting, a previous selection of the user, or a current selection of the user. A store-level availability at the pick-up store is determined at operation 536 for each item in the second filtered list of items. In some embodiments, the store-level availability check at the operation 536 also includes checking item availability at stores within a certain distance from the pick-up store or a zip code entered by the user.

Based on the store-level availability, the second filtered list of items is filtered at operation 536 to generate a first list of recommended items. The first list of recommended items include seasonal items ranked based on their respective seasonal rank scores. In some embodiments, the first list of recommended items may be sent to perform the operation 550 to generate final recommendations. In some examples, while top 500 items are sent from the seasonal ranking generation 520 to the store level optimization 530, the first list of recommended items sent to the operation 550 may include 40 to 60 items, after the filtering at the store level optimization 530.

In some embodiments, the final recommendations may be generated merely based on the first list of recommended items. In other embodiments, the final recommendations may be generated based on both the first list of recommended items and a second list of recommended items generated from the merchant recommendation analysis 540 based on items provided by at least one merchant in view of a seasonal event associated with the current seasonal time window.

In some embodiments, the merchant recommendation analysis 540 may incorporate merchant curated seasonal items into automatically generated seasonal recommendations from the seasonal ranking generation 520 and the store level optimization 530. An algorithm may be used to learn to detect similar seasonal items in the future, and rank the merchant items based on their recent performance.

In some embodiments, the merchant recommendation analysis 540 in FIG. 5 may be part of the functions performed by the merchant recommendation analyzer 408 in FIG. 4, and/or can be implemented by the item recommendation computing device 102 in FIG. 1. As shown in FIG. 5, the merchant recommendation analysis 540 starts from operation 542, where a tempo portal for merchants is checked to find available modules generated and uploaded by the merchants on the website of the retailer. In some embodiments, each module is uploaded or input to the tempo portal by a merchant, and may include a list of items provided by the merchant for a given seasonal event, where the list of items is to be published on the website during a publication period determined by the merchant. The list of items is generated by the merchant based on manual selection from all items available to the merchant, e.g. in view of a coming seasonal event.

At operation 544, each module is checked for validity in seasonal time windows. Different seasonal time windows generated by the season duration detection 510 can be obtained at operation 544. When the module is associated with a given seasonal event, the given seasonal event is validated at operation 544 by determining that the given seasonal event falls within a current seasonal time window of the seasonal time windows generated by the season duration detection 510. When the module is associated with a starting date or a publication period, a validity is checked at operation 544 by determining that the starting date or the publication period is associated with the current seasonal time window. For example, if a current date falls within the publication period and falls within the current seasonal time window, the publication period may be determined to be associated with the current seasonal time window.

For example, if a module uploaded to the tempo portal is specified to publish its items from November 15 to November 20, a first validity is checked to determine a current date, e.g. November 16, is falling within the specified publication period (November 15 to November 20). A second validity may be checked to determine that the current date also falls within one of the seasonal time windows, e.g. a Thanksgiving time window from November 1 to November 30. After the validations, an aggregated list of items from modules of the merchants are provided to operation 546 for ranking.

At the operation 546, trending scores are generated for the aggregated list of items based on the transaction data 506. For example, transaction data of the aggregated list of items during last month may be obtained. A trending score for each item may measure how many copies of the item were sold during last month. Then, the aggregated list of items are ranked at the operation 546 based on their respective trending scores to generate a ranked list of merchant-curated items. In some examples, a higher trending score of an item merely means a more popular selling trend for the item, assuming the merchants already considered seasonal relevance when providing these items.

At operation 548, the ranked list of merchant-curated items output from the operation 546 is split into multiple groups based on users' consideration intent. In some examples, as the operation 534, the ranked list of merchant-curated items are split into two groups: a low consideration group including low consideration items, and a high consideration group including high consideration items. Based on the consideration intent of the user who placed the transaction order, the ranked list of merchant-curated items can be filtered at the operation 548 to generate a second list of recommended items (merchant-curated items) that match the user's consideration intent.

In some embodiments, the different groups (e.g. low consideration group, high consideration group) of items split from the operation 548 may be stored in a database, e.g. the database 116 in FIG. 1, such that they can be re-used for item recommendations during different users' post transaction journey over a current time period, e.g. a current week, a current season, and/or the publication period specified for the merchant-curated items. In some embodiments, the second list of recommended items may be sent to perform the operation 550 to generate final recommendations.

In some embodiments, the final recommendation generation operation 550 may combine the merchant items (if available, from the merchant recommendation analysis 540) by interspersing them with the seasonal item rankings (output of the store level optimization 530) for each consideration intent and store. In some experiments, the combination of the recommended items from both the merchant recommendation analysis 540 and the store level optimization 530, shows a big improvement (e.g. 6 times more items added to cart at Easter season, and 22.7% more click through rate during Mother's Day season) compared to merchant curated only recommended items from the merchant recommendation analysis 540 alone.

In some embodiments, the final recommendation generation operation 550 in FIG. 5 may be part of the functions performed by the final recommendation generator 412 in FIG. 4, and/or can be implemented by the item recommendation computing device 102 in FIG. 1. As shown in FIG. 5, at operation 550, the first list of recommended items including seasonal ranking items from the operation 530 and the second list of recommended items including merchant-curated items from the operation 540 are combined to generate a final list of recommended items 560. For example, when the first list includes ordered items a1, a2, . . . , and the second list includes ordered items b1, b2, . . . , the two lists may be interspersed to each other to generate a final list including ordered items a1, b1, a2, b2 . . . , as the final recommendations. The two lists may also be combined in other manners in other embodiments.

In some embodiments, the final list of recommended items 560 may be transmitted to the user via a user device and/or the website, during the user's post transaction journey. For example, there are multiple post transaction webpages displayed to the user, including: a webpage for the user to schedule a pickup for the placed order, a webpage for the user to view/change the placed order. Then, the user may be motivated to add more items from the final list of recommended items 560 into the placed order, e.g. by the scheduled pickup time.

In some embodiments, the process shown in FIG. 5 may be performed every day, every week, every season, or multiple times a day. In some embodiments, different sub-processes in FIG. 5 may be performed at different frequencies. For example, the merchant recommendation analysis 540 may be performed every day to see whether a list of merchant-curated items has updated or whether any new module is provided by the merchants. For example, the season duration detection 510 in FIG. 5 may be performed every month or every year to update or validate the seasonal time windows.

FIG. 6 illustrates exemplary transaction data aggregated weekly over different product types, in accordance with some embodiments of the present teaching. As shown in table 600 of FIG. 6, transactions of different product types are aggregated weekly to show a transaction quantity for each product type in each week of the total 52 weeks of a year. The SI score computed at product type level focuses on a comparison within the product type itself and its performance across different weeks, i.e. focusing on each row of the table 600. For example, at week 52, although Books has a larger transaction quantity (24) than the transaction quantity (22) of Mint Candy, Books may not have a higher SI score in week 52 than Mint Candy, because Books have much higher transactions than Mint Candy in other weeks (e.g. weeks 1 and 2). On the other hand, the parameter a can take into consideration the transactions of different product types. As discussed above, the parameter a, e.g.

$$\alpha_{pt,w} = \frac{n_{\{pt\}}}{\sum_{pt=1}^{s} n_{\{pt\}}},$$

measures the transactions of a particular product type compared with transactions of all other product types during each week, i.e. focusing on each column of the table 600. Similarly, the parameter β, e.g.

$$\beta_{item,w} = \frac{n_{\{item\}}}{\sum_{item=1}^{N} n_{\{item\}}},$$

measures the transactions of a particular item compared with transactions of all other items. As such, a weighted sum of the product-level and item-level SI scores based on parameters α and β, can well balance different comparisons and considerations for seasonal item recommendations.

Figure 7:
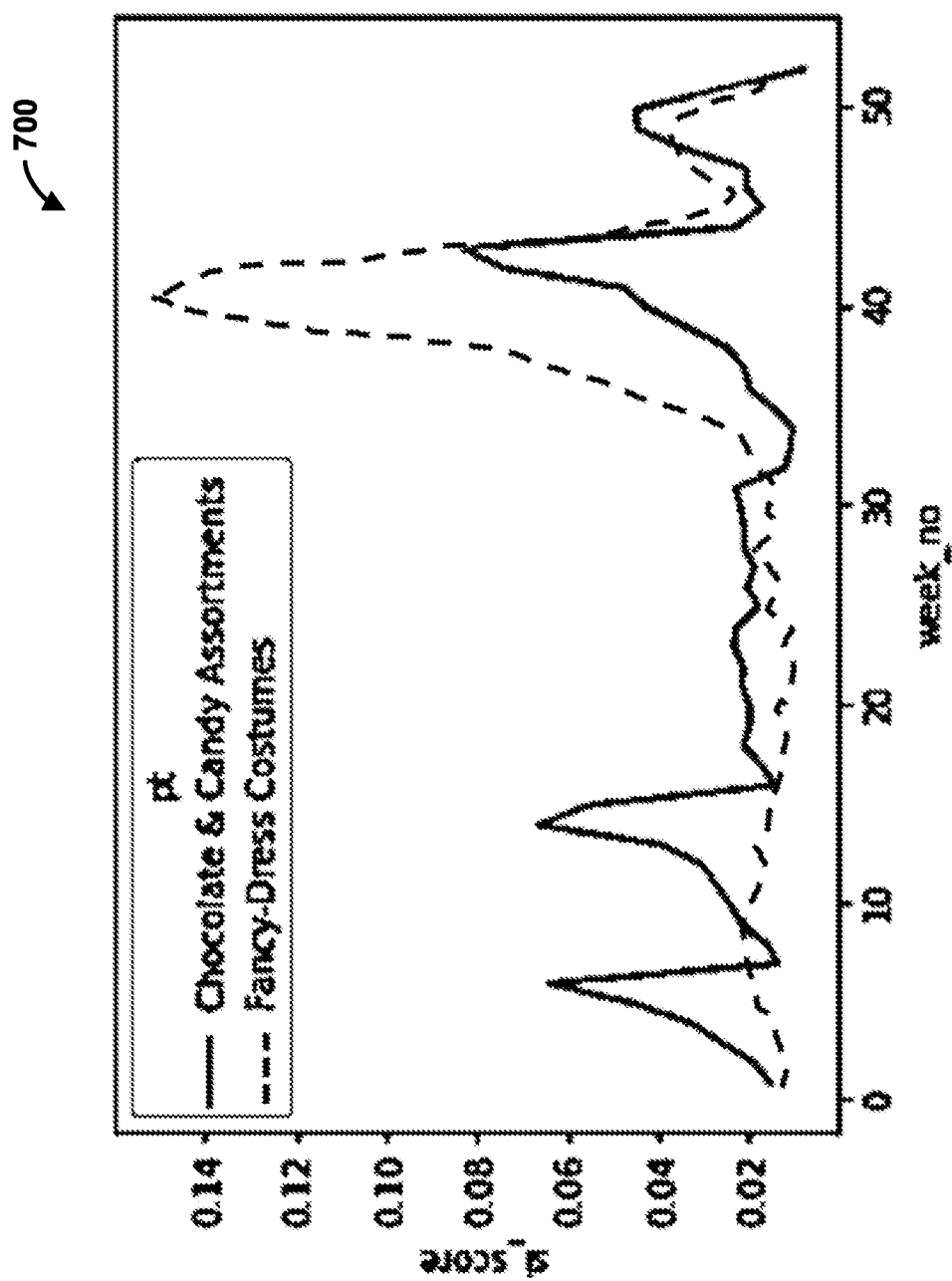
FIG. 7 illustrates seasonal index scores of two exemplary product types over a year, in accordance with some embodiments of the present teaching.

FIG. 7 illustrates seasonal index scores of two exemplary product types over a year, in accordance with some embodiments of the present teaching. The weekly SI scores for two exemplary product types, "Chocolate & Candy Assortments" and "Fancy-Dress Costumes", are shown in plot 700 of FIG. 7.

As shown in plot 700 of FIG. 7, Chocolate & Candy Assortments have multiple (but smaller) peaks (e.g. Valentine's Day, Easter, Halloween) in its SI score curve, while the SI score curve for Fancy-Dress Costumes has one main (but larger) peak (at Halloween). This is because when SI score is calculated, e.g. based on Algorithm 2, comparison is only performed for transactions across different weeks within the product type itself, without comparison across different product types. The Chocolate & Candy Assortments are thus penalized for having bigger aggregated transactions over a year.

For example, at week 42, which is associated with Halloween season, the SI score for Fancy-Dress Costumes is about 0.14, while the SI score for Chocolate & Candy Assortments is about 0.07. Each SI score may be calculated based on Algorithm 2. If the product type level SI score itself is used to rank different items, the Fancy-Dress Costumes will have 200 items in the top 500 ranked items; while the Chocolate & Candy Assortments will have only 12 items in the top 500 ranked items. This is not fair to items in Chocolate & Candy Assortments and may not be good item recommendations, because the product type level SI score does not compare transaction numbers across different product types. In this example, while the average weekly transaction for Fancy-Dress Costumes is 1.4 million; the average weekly transaction for Chocolate & Candy Assortments is 14.2 million.

That is, Fancy-Dress Costumes are almost only sold during this time (Halloween) of the year, such that they have a higher (about twice) the SI score compared to Chocolate & Candy Assortments, but the SI score does not take into consideration that Chocolate & Candy Assortments are sold multiple times (about 10 times). As such, the parameters a and B, can be used to remove the bias introduced by the SI sores. In this example, the parameters a and B can be used to push the items in Chocolate & Candy Assortments to a higher rank, to allow more items from Chocolate & Candy Assortments to flow into the item recommendations. This can help balancing the exposure of different product types in the item recommendations to the customers.

In addition, the item level SI score for each item of a corresponding product type may be piggybacked on its corresponding product type level SI score. First, it is not fair to give a same score to all items in a same product type. Second, because a big retailer may have millions of items and not all of them are always exposed to the customers, the SI scores and the corresponding weights (3) at the item level are usually very sparse. As such, a weighted sum of both the product-level score and item-level SI score based on parameters a and B, can well balance different comparisons with different granular levels for seasonal item recommendations, where the weights can be fine-tuned with updated transaction data from time to time.

Figure 8:
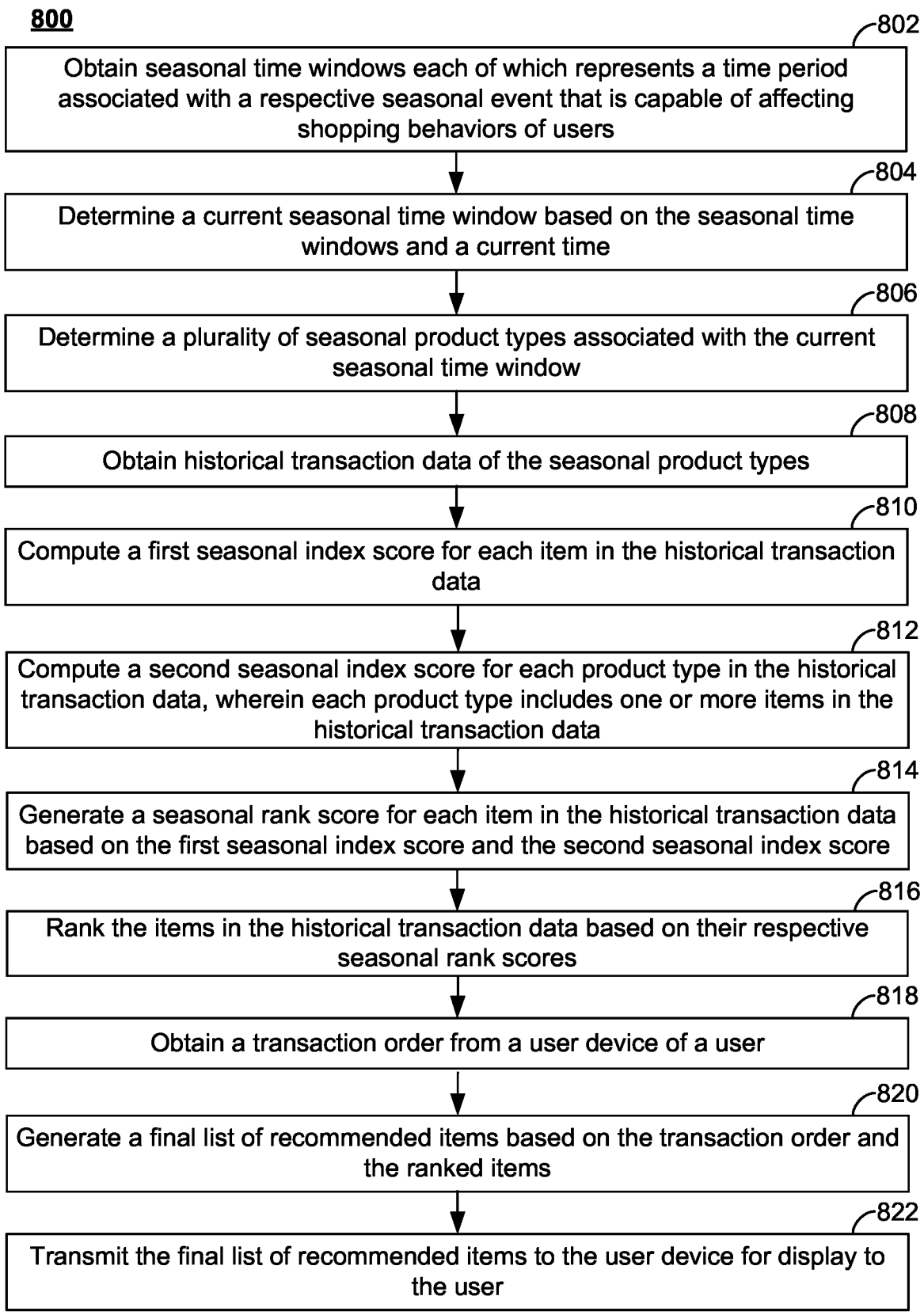
FIG. 8 is a flowchart illustrating an exemplary method for providing post transaction seasonal item recommendations, in accordance with some embodiments of the present teaching.

FIG. 8 is a flowchart illustrating an exemplary method for providing post transaction seasonal item recommendations, in accordance with some embodiments of the present teaching. In some embodiments, the method 800 can be carried out by one or more computing devices, such as the item recommendation computing device 102 and/or the cloud-based engine 121 of FIG. 1. Beginning at operation 802, seasonal time windows are obtained, where each seasonal time window represents a time period associated with a respective seasonal event that is capable of affecting shopping behaviors of users. At operation 804, a current seasonal time window is determined based on the seasonal time windows and a current time. At operation 806, a plurality of seasonal product types is determined to be associated with the current seasonal time window. Historical transaction data of the seasonal product types are obtained at operation 808. A first seasonal index score is computed at operation 810 for each item in the historical transaction data. A second seasonal index score is computed at operation 812 for each product type in the historical transaction data, where each product type includes one or more items in the historical transaction data.

At operation 814, a seasonal rank score is generated for each item in the historical transaction data based on the first seasonal index score and the second seasonal index score. The items in the historical transaction data are ranked at operation 816 based on their respective seasonal rank scores. At operation 818, a transaction order is obtained from a user device of a user. At operation 820, a final list of recommended items is generated based on the transaction order and the ranked items. At operation 822, the final list of recommended items is transmitted to the user device for display to the user.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
a processor; and
a non-transitory memory storing instructions that, when executed, cause the processor to:
based on a first frequency, generate a plurality of seasonal time windows each of which represents a time period associated with a respective seasonal event, wherein the plurality of seasonal time windows are generated by:
initializing, within a database, a set of cluster centroids based on at least one of the plurality of seasonal time windows and a search query; and
executing an iterative clustering algorithm that operates on each of the set of cluster centroids and converges each one of the set of cluster centroids to find a start bound and an end bound for each of a set of time bounds for each of the at least one of the plurality of seasonal time windows;
store the at least one of the plurality of seasonal time windows in thea database;
for each of the plurality of seasonal time windows, based on a second frequency, wherein the second frequency is greater than the first frequency:
obtain from the database catalog data for a plurality of products;
based on the catalog data, determine a plurality of seasonal product types that corresponds to a different seasonal time window of the at least one of the plurality of seasonal time windows;
obtain from the database historical transaction data, from a plurality of user transaction data stored in the database, of the seasonal product types;
execute an algorithm to operate on the corresponding seasonal time window, each item associated with the seasonal product types and the historical transaction data, and generate a first seasonal index score for each item in the historical transaction data;

execute the algorithm to operate on the corresponding seasonal time window, the seasonal product types, and the historical transaction data, and generate, for each product type in the historical transaction data, a second seasonal index score, wherein each product type includes one or more items in the historical transaction data;

generate a seasonal rank score for each item in the historical transaction data based on the first seasonal index score and the second seasonal index score, and store the seasonal rank score in the database;

generate a ranked item set of the one or more items in the historical transaction data based on their respective seasonal rank scores; and store the ranked item set in the database, where in the ranked item set is associated with the corresponding seasonal time window;

during a current user session, receive a transaction order from a user device of a user, and store the transaction order in the database;

responsive to receiving the transaction order:
determine a current seasonal time window based on the plurality of seasonal time windows and a current time;

extract, from the transaction order, a value of items in the transaction order;

determine a consideration intent of the user based on the value of items in the transaction order, the consideration intent identifying one of a plurality of intent groups;

select at least a portion of the ranked item set associated with the current seasonal time window as a final list of recommended items, personalized to the user, based on the transaction order and the consideration intent; and transmit, to the web server in an acceptable data format, instructions that cause inclusion of one or more items from the final list of recommended items for display on at least one post transaction webpage to the user device;

during the current user session, receive an updated transaction order from the web server for the user device of the user, the updated transaction order comprising a subset of recommended items selected by the user from the final list of recommended items displayed to the user; and in response to receiving the updated transaction order, update the transaction order within the database by adding the subset of recommended items into the transaction order, wherein the transaction order is executed to purchase the subset of recommended items.

2. The system of claim 1, wherein the processor executes the instructions to:

obtain historical interaction data including transaction data and search related data of users from at least last two years;

filter the historical interaction data based on keywords, each of which is predetermined to be associated with at least one seasonal event;

generate a frequency distribution of interactions across time based on the filtered historical interaction data; and for each of a plurality of seasonal events, determine a respective seasonal time window based on the frequency distribution of interactions and a pre-known date of the seasonal event.

3. The system of claim 2, wherein each of the plurality of seasonal events is at least one of: a season, a holiday, a festival, a sporting event, or a social event.

4. The system of claim 1, wherein the processor executes the instructions to:

aggregate the historical transaction data by week to generate weekly transaction data of the seasonal product types, wherein the historical transaction data is obtained from at least last one year;

compute a first weekly seasonal index score for each item and each week based on the weekly transaction data, wherein each first weekly seasonal index score measures a percentage of transactions of a respective item within a respective week among total transactions of the respective item over one year;

compute a second weekly seasonal index score for each product type and each week based on the weekly transaction data, wherein each second weekly seasonal index score measures a percentage of transactions of items in a respective product type within a respective week among total transactions of the items in the respective product type over one year;

compute a weighted sum of the first weekly seasonal index score and the second weekly seasonal index score; and generate the seasonal rank score based on the weighted sum.

5. The system of claim 4, wherein the processor executes the instructions to:

compute a first weight associated with the first weekly seasonal index score for each item and each week, wherein the first weight represents a percentage of transactions of a respective item among total transactions of all items within a respective week;

compute a second weight associated with the second weekly seasonal index score for each item and each week, wherein the second weight represents a percentage of transactions of a respective product type among total transactions of all product types within a respective week; and compute the weighted sum of the first weekly seasonal index score and the second weekly seasonal index score, based on the first weight and the second weight.

6. The system of claim 4, wherein the processor executes the instructions to:

compute a seasonal theme score for each item and each week based on search related data of users; and generate the seasonal rank score based on a weighted sum of: the first weekly seasonal index score, the second weekly seasonal index score and the seasonal theme score.

7. The system of claim 1, wherein the processor executes the instructions to:

filter items in each product type of the historical transaction data, to remove items whose transaction quantity is less than a threshold, wherein the threshold is determined based on a median quantity of transactions of the one or more items in the historical transaction data; and determine, based on the filtered items, top items ranked based on their respective seasonal rank scores.

8. The system of claim 7, wherein the processor executes the instructions to:

filter the top items to generate a first filtered list of items that are offered for purchase;
determine a consideration intent of the user based on the transaction order;
filter, based on the consideration intent of the user, the first filtered list of items to generate a second filtered list of items that match the consideration intent;
determine a store for the user to pick up items of the transaction order;
determine a store-level availability at the store for each item in the second filtered list of items; and
filter, based on the store-level availability, the second filtered list of items to generate a first list of recommended items, wherein the first list of recommended items are ranked based on their respective seasonal rank scores.

9. The system of claim 8, wherein the processor executes the instructions to:
obtain a second list of recommended items generated based on items provided by at least one merchant in view of a seasonal event associated with the current seasonal time window; and
generate the final list of recommended items by interspersing the first list of recommended items and the second list of recommended items with each other.

10. The system of claim 9, wherein the processor executes the instructions to:
obtain a list of items provided by the at least one merchant for a given seasonal event, wherein the list of items is to be published on a website during a publication period determined by the at least one merchant;
validate that both the given seasonal event and the publication period are associated with the current seasonal time window;
generate trending scores for the list of items based on their respective transaction quantities during last month;
rank the list of items based on their respective trending scores to generate a ranked list of items; and
filter, based on the consideration intent of the user, the ranked list of items to generate the second list of recommended items.

11. A computer-implemented method, comprising:
based on a first frequency, generating a plurality of seasonal time windows each of which represents a time period associated with a respective seasonal event, wherein the plurality of seasonal time windows are generated by:
initializing, within a database, a set of cluster centroids based on at least one of the plurality of seasonal time windows and a search query; and
executing an iterative clustering algorithm that operates on each of the set of cluster centroids and converges each one of the set of cluster centroids to find a start bound and an end bound for each of a set of time bounds for each of the at least one of the plurality of seasonal time windows;
storing the at least one of the plurality of seasonal time windows in the database;
for each of the plurality of seasonal time windows, based on a second frequency, wherein the second frequency is greater than the first frequency:
obtaining from the database catalog data for a plurality of products;
based on the catalog data, determining a plurality of seasonal product types that corresponds to a different seasonal time window of the at least one of the plurality of seasonal time windows;
obtaining, from the database, historical transaction data, from a plurality of user transaction data stored in the database, of the seasonal product types;
executing an algorithm to operate on the corresponding seasonal time window, each item associated with the seasonal product types and the historical transaction data, and generating a first seasonal index score for each item in the historical transaction data;
executing the algorithm to operate on the corresponding seasonal time window, the seasonal product types, and the historical transaction data, and in response generating, for each product type in the historical transaction data, a second seasonal index score, wherein each product type includes one or more items in the historical transaction data;
generating a seasonal rank score for each item in the historical transaction data based on the first seasonal index score and the second seasonal index score, and storing the seasonal rank score in the database;
generating a ranked item set of the one or more items in the historical transaction data based on their respective seasonal rank scores; and
storing the ranked item set in the database, where in the ranked item set is associated with the corresponding seasonal time window;
during a current user session, receiving a transaction order from a user device of a user, and storing the transaction order in the database;
responsive to receiving the transaction order:
determining a current seasonal time window based on the plurality of seasonal time windows and a current time;
extracting, from the transaction order, a value of items in the transaction order;
determining a consideration intent of the user based on the value of items in the transaction order, the consideration intent identifying one of a plurality of intent groups;
selecting at least a portion of the ranked item set associated with the current seasonal time window as a final list of recommended items, personalized to the user, based on the transaction order and the consideration intent; and
transmitting, to the web server in an acceptable data format, instructions that cause inclusion of one or more items from the final list of recommended items for display on at least one post transaction webpage;
during the current user session, receiving an updated transaction order from the web server for the user device of the user, the updated transaction order comprising a subset of recommended items selected by the user from the final list of recommended items displayed to the user; and
in response to receiving the updated transaction order, updating the transaction order within the database by adding the subset of recommended items into the transaction order, wherein the transaction order is executed to purchase the subset of recommended items.

12. The computer-implemented method of claim 11, further comprising:
obtaining historical interaction data including transaction data and search related data of users from at least last two years;
filtering the historical interaction data based on keywords, each of which is predetermined to be associated with at least one seasonal event;

generating a frequency distribution of interactions across time based on the filtered historical interaction data; and for each of a plurality of seasonal events, determining a respective seasonal time window based on the frequency distribution of interactions and a pre-known date of the seasonal event, wherein each of the plurality of seasonal events is at least one of: a season, a holiday, a festival, a sporting event, or a social event.

13. The computer-implemented method of claim 11, further comprising:

aggregating the historical transaction data by week to generate weekly transaction data of the seasonal product types, wherein the historical transaction data is obtained from at least last one year;

computing a first weekly seasonal index score for each item and each week based on the weekly transaction data, wherein each first weekly seasonal index score measures a percentage of transactions of a respective item within a respective week among total transactions of the respective item over one year;

computing a second weekly seasonal index score for each product type and each week based on the weekly transaction data, wherein each second weekly seasonal index score measures a percentage of transactions of items in a respective product type within a respective week among total transactions of the items in the respective product type over one year;

computing a first weight associated with the first weekly seasonal index score for each item and each week, wherein the first weight represents a percentage of transactions of a respective item among total transactions of all items within a respective week;

computing a second weight associated with the second weekly seasonal index score for each item and each week, wherein the second weight represents a percentage of transactions of a respective product type among total transactions of all product types within a respective week; and computing a weighted sum of the first weekly seasonal index score and the second weekly seasonal index score, based on the first weight and the second weight; and generating the seasonal rank score based on the weighted sum.

14. The computer-implemented method of claim 11, further comprising:

filtering items in each product type of the historical transaction data, to remove items whose transaction quantity is less than a threshold, wherein the threshold is determined based on a median quantity of transactions of the one or more items in the historical transaction data;

determining, based on the filtered items, top items ranked based on their respective seasonal rank scores;

filtering the top items to generate a first filtered list of items that are offered for purchase;

determining a consideration intent of the user based on the transaction order;

filtering, based on the consideration intent of the user, the first filtered list of items to generate a second filtered list of items that match the consideration intent;

determining a store for the user to pick up items of the transaction order;

determining a store-level availability at the store for each item in the second filtered list of items; and filtering, based on the store-level availability, the second filtered list of items to generate a first list of recommended items, wherein the first list of recommended items are ranked based on their respective seasonal rank scores.

15. The computer-implemented method of claim 14, further comprising:

obtaining a second list of recommended items generated based on items provided by at least one merchant in view of a seasonal event associated with the current seasonal time window; and generating the final list of recommended items by interspersing the first list of recommended items and the second list of recommended items with each other.

16. A non-transitory computer readable medium having instructions stored thereon, wherein the instructions, when executed by at least one processor, cause at least one device to perform operations comprising:

based on a first frequency, generating a plurality of seasonal time windows each of which represents a time period associated with a respective seasonal event, wherein the plurality of seasonal time windows is generated by:

initializing, within a database, a set of cluster centroids based on at least one of the plurality of seasonal time windows and a search query; and executing an iterative clustering algorithm that operates on each of the set of cluster centroids and converges each one of the set of cluster centroids to find a start bound and an end bound for each of a set of time bounds for each of the at least one of the plurality of seasonal time windows;

storing the at least one of the plurality of seasonal time windows in thea database;

for each of the plurality of seasonal time windows, based on a second frequency, wherein the second frequency is greater than the first frequency:

obtaining from the database catalog data for a plurality of products;

based on the catalog data, determining a plurality of seasonal product types that corresponds to a different seasonal time window of the at least one of the plurality of seasonal time windows;

obtaining, from the database, historical transaction data, from a plurality of user transaction data stored in the database, of the seasonal product types;

executing an algorithm to operate on the corresponding seasonal time window, each item associated with the seasonal product types and the historical transaction data, and generating a first seasonal index score for each item in the historical transaction data;

executing the algorithm to operate on the corresponding seasonal time window, the seasonal product types, and the historical transaction data, and in response generating, for each product type in the historical transaction data, a second seasonal index score, wherein each product type includes one or more items in the historical transaction data;

generating a seasonal rank score for each item in the historical transaction data based on the first seasonal index score and the second seasonal index score, and storing the seasonal rank score in the database;

generating a ranked item set of the one or more items in the historical transaction data based on their respective seasonal rank scores; and storing the ranked item set in the database, where in the ranked item set is associated with the corresponding seasonal time window;

during a current user session, receiving a transaction order from a user device of a user, and storing the transaction order in the database;

responsive to receiving the transaction order:
  determining a current seasonal time window based on the plurality of seasonal time windows and a current time;
  extracting, from the transaction order, a value of items in the transaction order;
  determining a consideration intent of the user based on the value of items in the transaction order, the consideration intent identifying one of a plurality of intent groups;
  selecting at least a portion of the ranked item set associated with the current seasonal time window as a final list of recommended items, personalized to the user, based on the transaction order and the consideration intent; and
  transmitting, to the web server in an acceptable data format, instructions that cause inclusion of one or more items from the final list of recommended items for display on at least one post transaction webpage;
  during the current user session, receiving an updated transaction order from the web server for the user device of the user, the updated transaction order comprising a subset of recommended items selected by the user from the final list of recommended items displayed to the user; and
  in response to receiving the updated transaction order, updating the transaction order within the database by adding the subset of recommended items into the transaction order, wherein the transaction order is executed to purchase the subset of recommended items.

17. The non-transitory computer readable medium of claim 16, wherein the instructions, when executed by the at least one processor, cause the at least one device to further perform operations comprising:
  obtaining historical interaction data including transaction data and search related data of users from at least last two years;
  filtering the historical interaction data based on keywords, each of which is predetermined to be associated with at least one seasonal event;
  generating a frequency distribution of interactions across time based on the filtered historical interaction data; and
  for each of a plurality of seasonal events, determining a respective seasonal time window based on the frequency distribution of interactions and a pre-known date of the seasonal event, wherein each of the plurality of seasonal events is at least one of: a season, a holiday, a festival, a sporting event, or a social event.

18. The non-transitory computer readable medium of claim 16, wherein the instructions, when executed by the at least one processor, cause the at least one device to further perform operations comprising:
  aggregating the historical transaction data by week to generate weekly transaction data of the seasonal product types, wherein the historical transaction data is obtained from at least last one year;
  computing a first weekly seasonal index score for each item and each week based on the weekly transaction data, wherein each first weekly seasonal index score measures a percentage of transactions of a respective item within a respective week among total transactions of the respective item over one year;
  computing a second weekly seasonal index score for each product type and each week based on the weekly transaction data, wherein each second weekly seasonal index score measures a percentage of transactions of items in a respective product type within a respective week among total transactions of the one or more items in the respective product type over one year;
  computing a first weight associated with the first weekly seasonal index score for each item and each week, wherein the first weight represents a percentage of transactions of a respective item among total transactions of all items within a respective week;
  computing a second weight associated with the second weekly seasonal index score for each item and each week, wherein the second weight represents a percentage of transactions of a respective product type among total transactions of all product types within a respective week; and
  computing a weighted sum of the first weekly seasonal index score and the second weekly seasonal index score, based on the first weight and the second weight; and
  generating the seasonal rank score based on the weighted sum.

19. The non-transitory computer readable medium of claim 16, wherein the instructions, when executed by the at least one processor, cause the at least one device to further perform operations comprising:
  filtering items in each product type of the historical transaction data, to remove items whose transaction quantity is less than a threshold, wherein the threshold is determined based on a median quantity of transactions of the one or more items in the historical transaction data;
  determining, based on the filtered items, top items ranked based on their respective seasonal rank scores;
  filtering the top items to generate a first filtered list of items that are offered for purchase;
  determining a consideration intent of the user based on the transaction order;
  filtering, based on the consideration intent of the user, the first filtered list of items to generate a second filtered list of items that match the consideration intent;
  determining a store for the user to pick up items of the transaction order;
  determining a store-level availability at the store for each item in the second filtered list of items; and
  filtering, based on the store-level availability, the second filtered list of items to generate a first list of recommended items, wherein the first list of recommended items are ranked based on their respective seasonal rank scores.

20. The non-transitory computer readable medium of claim 19, wherein the instructions, when executed by the at least one processor, cause the at least one device to further perform operations comprising:
  obtaining a second list of recommended items generated based on items provided by at least one merchant in view of a seasonal event associated with the current seasonal time window; and
  generating the final list of recommended items by interspersing the first list of recommended items and the second list of recommended items with each other.

* * * * *